United States Patent [19]
Warren

[11] Patent Number: 4,890,391
[45] Date of Patent: Jan. 2, 1990

[54] COMMERCIAL ELECTRICAL BOX ALIGNMENT TOOL

[76] Inventor: Donald Warren, P.O. Box 7000-515, Redondo Beach, Calif. 90277

[21] Appl. No.: 306,983

[22] Filed: Feb. 7, 1989

[51] Int. Cl.⁴ ......................... B25B 3/00; B25B 11/00
[52] U.S. Cl. ................................. 33/613; 33/DIG. 10
[58] Field of Search ................ 33/DIG. 10, 528, 613; 269/6, 50, 904

[56] References Cited

U.S. PATENT DOCUMENTS

| | | |
|---|---|---|
| 2,919,913 | 1/1960 | Phair . |
| 2,962,281 | 11/1960 | Hodgson . |
| 2,990,172 | 6/1961 | Gianotta . |
| 3,436,070 | 4/1969 | Utley . |
| 3,751,026 | 8/1973 | Stickney . |
| 3,875,669 | 4/1975 | Hull . |
| 3,954,717 | 5/1976 | Tarr . |
| 4,126,941 | 11/1978 | Clarke . |
| 4,290,591 | 9/1981 | Smith . |
| 4,750,271 | 6/1988 | Ericksen ..................... 33/613 |

Primary Examiner—Harry N. Haroian
Attorney, Agent, or Firm—Lee W. Tower

[57] ABSTRACT

An alignment tool for simultaneously and accurately installing a commercial electrical box on each side of a stud, which can be made of wood or metal, has a tube mounted to a frame and stud standoff gauges mounted to the tube or the frame and a box holder assembly mounted on the tube with first and second side surfaces separated by the width of about 2 1/16 inches and having depth tabs on both the first and second side surfaces of the box holder assembly placed with respect to the stud standoff gauges to provide for an electrical box setback of about = inch from the front of the stud, which accounts for a plaster ring flange depth. A box holding spring is provided for holding commercial electrical boxes on the box holder assembly. First and second binary gauges are mounted on the tube below the box holder assembly with each binary gauge having two positions for selecting the centerline alignment for either "4-S" "5-S" commercial electrical boxes. Sockets are provided in the frame for mounting a height gauge for setting the vertical distance between a plane such as a floor or ceiling and the centerline alignment of the commercial electrical boxes.

11 Claims, 2 Drawing Sheets

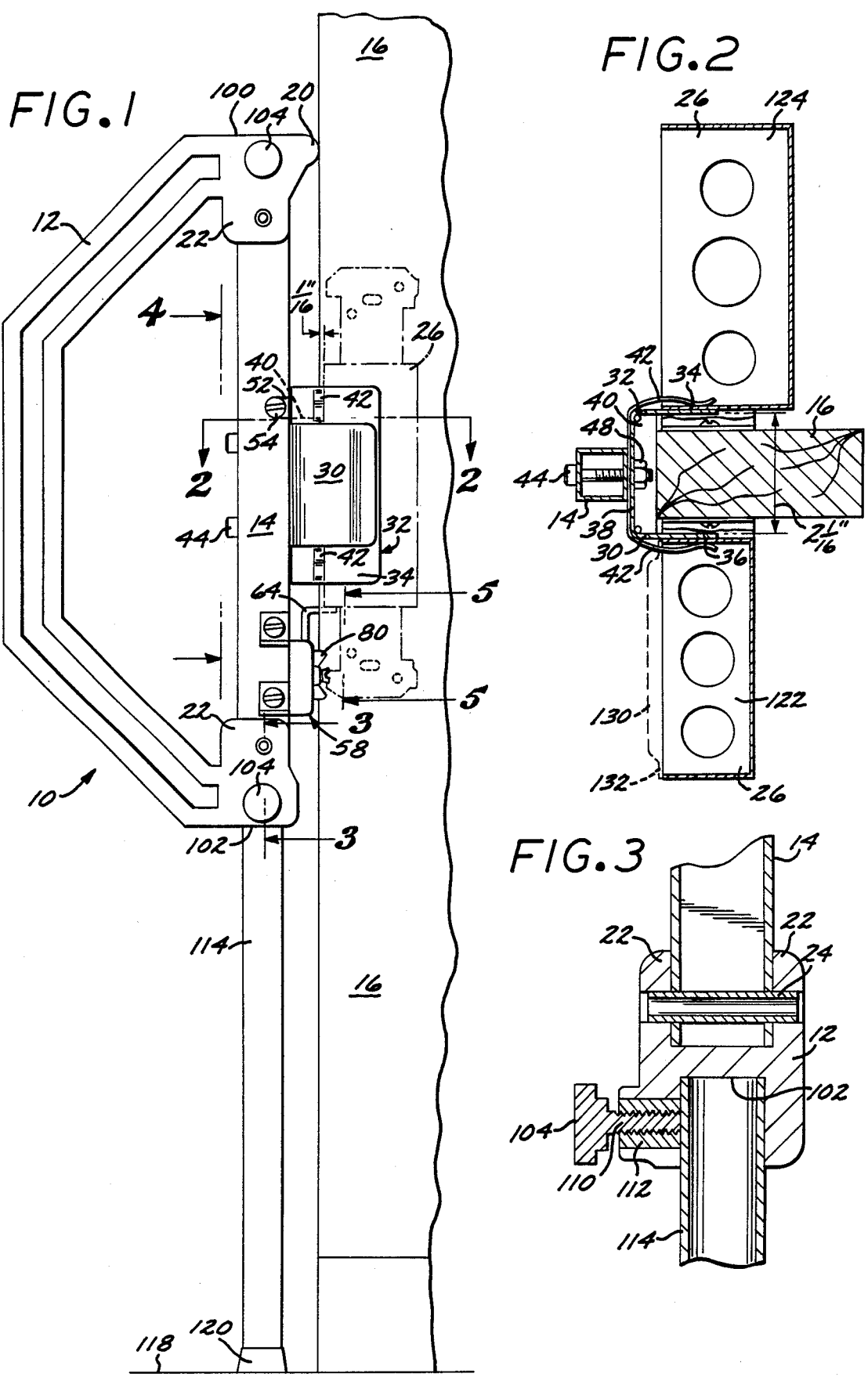

COMMERCIAL ELECTRICAL ALIGNMENT BOX TOOL

BACKGROUND OF THE INVENTION

1. Field of the Invention

This invention relates generally to tools for mounting electrical boxes and more particularly to a tool that allows the simultaneous alignment of two commercial electrical boxes on each side of a stud.

2. Prior Art

To properly install commercial electrical boxes three parameters must be satisfied: proper height, depth and uniformity. To be feasible the method of installation must also be economical. There have been a number of designs for installing residential outlet boxes, which generally provide some method of maintaining a proper depth of the outlet box from the front of a stud and also maintaining the proper height of the outlet with respect to the floor.

The prior art generally addresses residential outlet boxes, such as U.S. Pat. No. 4,290,591 issued to Smith. Commercial outlet boxes are of a special type and are used in commercial construction. Whereas residential buildings are generally wired using Romex wiring, commercial buildings must by code have conduit between all the electrical boxes. Commercial electrical boxes are larger than residential electrical boxes and two distinct sizes are used: 4 inch and 4 11/16 inch square. Larger conduit can be used with the 4 11/16 inch square box than with the 4 inch square box and more cubic inch capacity is provided.

There are special mounting problems associated with mounting commercial electrical boxes. The first unique problem is that often two commercial boxes are mounted side by side on either side of a stud, which can be made of either wood or metal. One box might be used for electrical distribution, while the other box is used for communications such as telephone and computer links. For the appearance of the boxes to be attractive the two boxes must have the same centerline. In other words the center of a 4 inch square box mounted on one side of a stud and the center of a 4 11/16 inch square box mounted on the other side of the stud should have equal height above some fixed plane such as a level floor. This is quite different than residential electrical boxes which are generally not mounted side by side. Also residential boxes are generally all of the same height with different widths so if they are mounted side by side it is generally just their height that needs to be equal with respect to a reference - not their centers.

The various commercial electrical boxes within a room must be aligned the same or the unattractive variance will be immediately apparent.

For commercial electrical boxes the front edge of the box must be set back just ⅛ inch behind the front of the stud. This accounts for the thickness of the flange of a plaster ring, which is mounted onto the commercial electrical box after the wiring is complete. The plaster ring protrudes beyond the stud to be even with the outside of the drywall or plaster later applied over the studs. This is different than a residential electrical box whose front edge is generally mounted to protrude beyond the front of the stud to the depth of drywall or plaster to be applied.

Presently, commercial electrical boxes are aligned by hand. Just quick measurements are performed and the boxes attached. Since the electrical work is done at a fixed price there is generally a rush to complete the work. This leads to a situation where the boxes are poorly aligned. The boxes can end up at different heights with side by side boxes misaligned. Misalignment can also occur with the boxes not at the correct depth or at an angle not aligned with the stud, so that one edge such as the top edge of the box is tipped with respect to the bottom edge.

Exasperating these problems is the fact that often the floor of a commercial building may not be level; however, the ceiling of commercial buildings are usually set by a laser, which assures exact elevations. Due to the inconvenience of making quick measurements from the ceiling, this is not now done as a matter of practice.

Therefore, a need exists for a device which solves these and other problems arising during the installation of commercial electrical boxes.

SUMMARY OF THE INVENTION

It is a primary object of the present invention to provide a tool for the accurate installation of commercial electrical outlet boxes onto a stud. It is another object of the present invention to provide a tool which is mechanically simple, reliable, and easy to use.

Another primary object of the present invention is to provide a tool which allows the accurate installation of 4 inch and 4 11/16 inch commercial boxes on a stud. It is a further object of the invention to provide for side by side installation on each side of a stud any combination of the 4 inch and 4 11/16 inch square commercial boxes, so that their centers will be properly aligned.

It is another object of the present invention to provide a tool which will properly set the depth of commercial electrical boxes with respect to the stud and allow proper installation of a plaster ring. It is further object of the present invention to provide a tool for properly setting the height of the boxes for uniformity within a room or along a wall. It is another object of the invention to provide for sockets within the frame of the tool for the insertion of height gauges between the frame and the floor or a ceiling. The latter is provided for the greater accuracy attained from measuring from a laser set ceiling.

It is another object of the present invention to provide a frame that provides a handle that is convenient to use and also incorporates a stud standoff that positions the tool properly for use.

The features of the present invention which are believed to be novel are set forth with particularity in the appended claims. Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 1 is a side elevational view of the preferred embodiment of the commercial electrical box alignment tool.

FIG. 2 is a top sectional view along the line 2—2 on FIG. 1 showing the horizontal alignment of the commercial electrical boxes.

FIG. 3 is a side elevational view along the line 3—3 on FIG. 1 showing the detail for mounting a height gauge in the frame.

DESCRIPTION OF THE PREFERRED EMBODIMENTS

Figure 4:
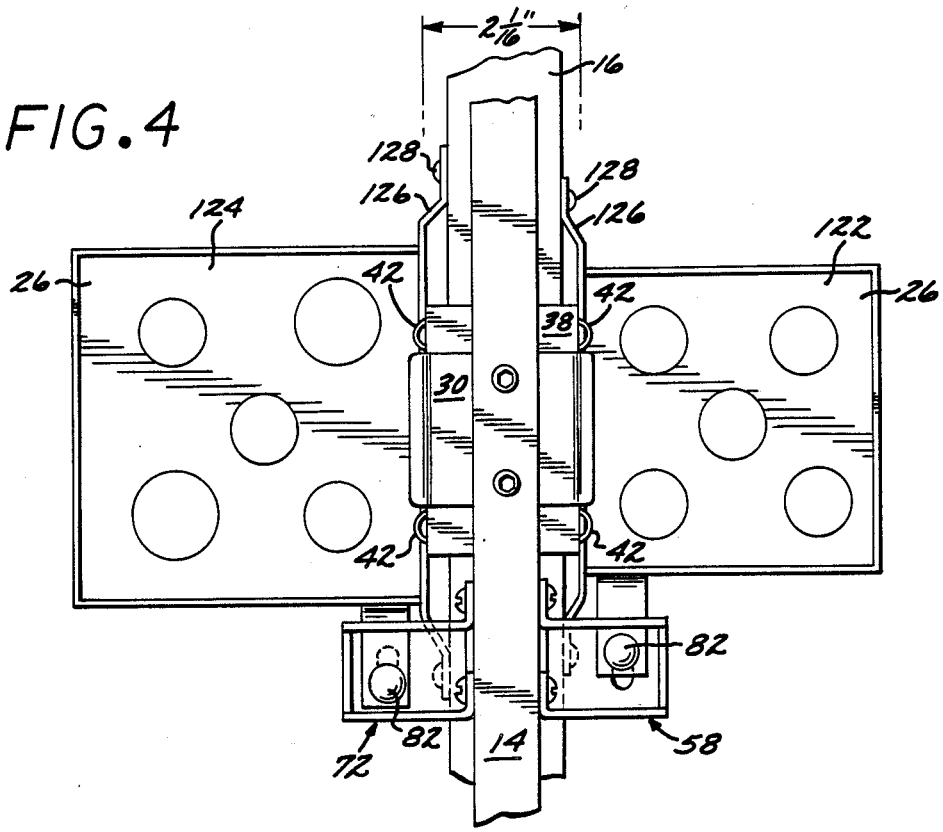
FIG. 4 is a front elevational view along the line 4—4 on FIG. 1 showing two electrical boxes mounted on the commercial electrical box alignment tool with their centers aligned.

Referring now to the drawings, and more particularly, to FIG. 1, there is shown a commercial electrical box alignment tool generally designated 10, which comprises the preferred embodiment of the present invention. The commercial electrical box alignment tool 10 is shown relative to stud 16 and electrical box 26, shown in dotted form. The commercial electrical box alignment tool 10 basically includes a frame 12, a rectangular tube 14, a box holder assembly 32 and associated box holding spring 30, and a pair of binary gauges such as first binary gauge 58, shown in FIG. 1. The rectangular tube 14, which can be either fully rectangular or made of 3 sided channel steel, is mounted into frame 12 at upper and lower frame tube mounts 22. FIG. 3 shows a mounting detail of the rectangular tube 14 in the frame tube mount 22 and held there by spring pin 24, which is pressed fit through matching holes in frame 12 and rectangular tube 14. Frame 12 supplies the handle for commercial electrical box alignment tool 10. Also built into frame 12 is frame stud standoff 20, which provides a measured offset from the front of stud 16 to one end of rectangular tube 14. Another frame stud standoff can also be built into the frame in the same manner on the other end of the frame near bottom cylindrical socket 102.

Top cylindrical socket 100 and bottom cylindrical socket 102 are built into the frame and are designed to accept height gauge 114, which can be made from electrical metallic tubing (EMT), which is easily available at a commercial construction site. To set the vertical height of the electrical boxes relative to the floor a piece of EMT would be cut and inserted into bottom cylindrical socket 102, as shown in FIG. 3, and held there by tightening knob 104, which brings screw 110 to bear on height gauge 114. The screw 110 is mounted in insert 112, which is press fit into frame 12. As shown in FIG. 1, a pad 120 can be put on the height gauge end that contacts the floor 118. Often in a commercial construction site the ceiling is more level than the floor, because the ceiling is set by a lazer. To take advantage of this, a top cylindrical socket 100 is provided, which operates the same as the bottom cylindrical socket 102.

As shown in FIG. 1, a box holder assembly 32 is mounted on rectangular tube 14 by screws 44 and also by screw 54 which is mounted through a box holder punchout, which has hole 52. Also shown in FIG. 1 is one part of box holding spring 30. An alternate way to set the measured offset from the rectangular tube 14 to the stud 16 is to have a stud standoff gauge 40, which is shown as a hidden line on FIG. 1. The stud standoff gauge 40 would operate along with the frame stud standoff 20 to provide the proper offset. Note that the face of the stud 16 and the length of rectangular tube 14 are parallel. Protruding from the first side surface 34 of box holder assembly 32 are depth tabs 42, which are located relative to frame stud standoff 20 and stud standoff gauge 40. The depth tabs 42 have the purpose of setting the horizontal alignment of the electrical box 26 and they are positioned on the first side surface 34 at a depth which ensures that there will be ⅛ inch between the front of the stud 16 and the electrical box 26, as shown in FIG. 1, which provides the proper space for plaster ring flange 132, as shown in FIG. 2. In one preferred embodiment, the stud standoff gauge 40 is an integral part of the box holder assembly 32, which ensures that the correct offset distances are maintained. Alternately, the stud standoff gauge can be mounted separately onto rectangular tube 14 or it can be eliminated and instead another frame stud standoff can be built into the other end of the frame in the same manner as frame stud standoff 20, as discussed above.

Mounted below box holder assembly 32, is the first binary gauge 58, which is one of a pair. The purpose of the first binary gauge 58 is to provide a binary gauge for properly positioning two sizes of electrical boxes relative to one another. In commercial construction there are two sizes or types of electrical boxes used. These are the 4 inch square box and the 4 11/16 inch square box, which are referred to in the trade as the "4-S" and "5-S" bracket boxes, respectively. In mounting two such boxes on either side of a stud, it is desired to mount them so that their centers are aligned. The binary gauges provide this facility as will be more apparent as FIGS. 4, 5, 6, and 7 are discussed below.

FIG. 2 is a top sectional view along the line 2—2 on FIG. 1 showing the horizontal alignment of the electrical boxes. In FIG. 2 it is readily seen how box holder assembly 32 is mounted onto rectangular tube 14 via screw 44 and nut 48. Also apparent is how box holding spring 30 is wrapped entirely around box holder assembly 32. The box holding spring 30 is made of stainless spring steel and provides tension to the side surfaces of box holder assembly 32, which in FIG. 2 are designated first side surface 34 and second side surface 36. The electrical boxes 26 are mounted between the side surfaces and box holding spring 30. As indicated above, the depth of the electrical boxes is determined by depth tabs 42. To account for the width of the stud 16 and the electrical box bracket 126, the side surfaces of box holder assembly 32 are about 2 1/16 inches apart, as shown in FIG. 2. The location for mounting a plaster ring 130 onto the electrical box 26 is shown in FIG. 2. The plaster ring flange 132 has a thickness of ⅛ inch, which explains the purpose of locating the depth tabs 42 so that the electrical boxes will be set ⅛ inch back from the front of the stud 16. Once plaster is added on top of the stud, the plaster ring 130 provides the proper offset to mount a plate even with the surface of the plaster.

FIG. 4 is a front elevational view along the line 4—4 on FIG. 1 showing two electrical boxes mounted on the commercial electrical box alignment tool with their centers aligned. In FIG. 4 the electrical box brackets 126 are more clearly shown than in any other drawing and it is evident why 2 1/16 inches width is provided to account for the 1½ inch width stud plus the approximately ¼ of an inch for each electrical box bracket 126. Also clearly shown are the first binary gauge 58 and the second binary gauge 72, which are set so that the centers of the 4 inch electrical box 122 and the 4 11/16 inch electrical box 124 are aligned. This is accomplished by setting the first binary gauge 58 in the maximally up position for the 4 inch electrical box 122 and the second binary gauge 72 in the maximally down position for the 4 11/16 inch electrical box 124. These binary gauges are set depending on the type of electrical boxes to be installed. Then the boxes are just placed onto the tool which automatically aligns them properly. Finally, the electrical boxes are fastened to the stud 16 by screws 128.

Figure 5:
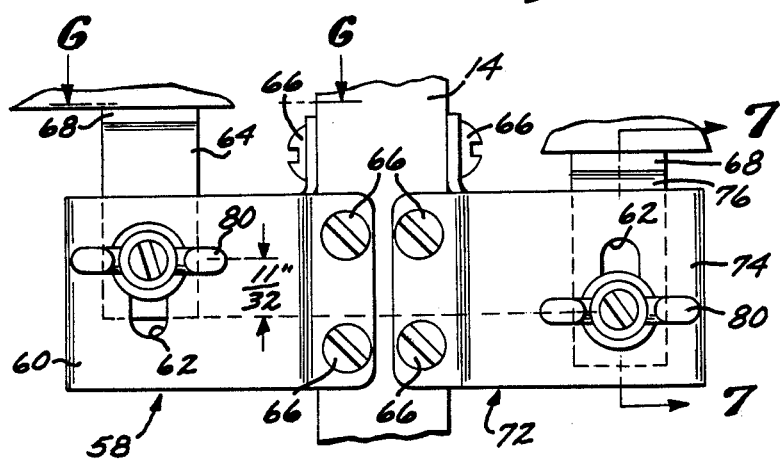
FIG. 5 is a rear elevational view along the line 5—5 of FIG. 1 showing the first and second binary gauges.
Figure 6:
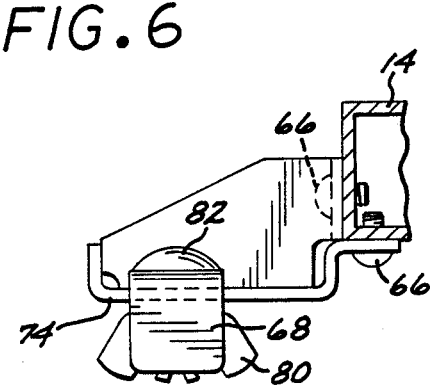
FIG. 6 is a view along the line 6—6 of FIG. 5.
Figure 7:
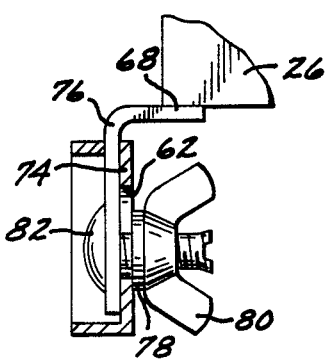
FIG. 7 is a view along the line 7—7 of FIG. 5.

FIG. 5, which is a section of FIG. 1, shows more of the binary gauge detail. The first binary gauge 58 comprises a first gauge housing 60 which has a slot 62, whose length is 11/32 of an inch. The first binary gauge 58 is mounted on the rectangular tube 14 by screws 66. A first gauge 64 is slidably mounted in slot 62 by the use of a wingnut 80, washer 78 and screw 82, as shown in FIG. 7. The first gauge 64 has a shelf 68 upon which the electrical box 26 can rest. Similarly, second binary gauge 72 comprises a second gauge housing 74 and a second gauge 76. FIGS. 6 and 7 show sections of FIG. 5.

An alternate way to build the tool is to have the binary gauges constructed as one piece. Thus, first binary gauge 58 and second binary gauge 72 are made of one piece of material such as metal, which can then be welded onto rectangular tube 14. This eliminates screws 66. Also wingnut 80, washer 78, and screw 82 can be replaced by a thumbscrew, a washer, and a press fit pemnut, which would perform the same function.

It is thought that the commercial electrical box alignment tool of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. An alignment tool for simultaneously and accurately installing a commercial electrical box on each side of a stud, comprising:
   a frame having at least one frame stud standoff; and
   a rectangular tube mounted to said frame so that said rectangular tube is held parallel to and away from the front of a stud by an amount set by said frame stud standoff; and
   a box holder assembly mounted on said rectangular tube and having first and second side surfaces extending away from and parallel to said frame and parallel to one another with said first and second side surfaces separated to by about 2 1/16 inches to accommodate the width of a stud and bracket offsets for two electrical boxes; and
   at least one depth tab on both the first and second side surfaces of said box holder assembly placed with respect to said frame stud standoff to provide for an electrical box setback of about ⅛ inch from the front of the stud to account for a plaster ring flange depth; and
   a box holding spring mounted on said box holder assembly and maintaining tension on the first and second side surfaces of said box holder assembly; and
   a first binary gauge mounted to said rectangular tube below said first side of said box holder assembly for selecting the centerline alignment for either 4 inch or 4 11/16 inch square electrical boxes; and
   a second binary gauge mounted to said rectangular tube below said second side of said box holder assembly for selecting the centerline alignment for either 4 inch or 4 11/16 inch square electrical boxes; and
   a height gauge mounted on said frame for setting the vertical distance between a plane such as a floor or ceiling and the centerline alignment of said electrical boxes determined by said first and second binary gauges; and
   wherein when said frame stud standoff gauge is aligned along the front length of a stud and said first and second side surfaces of said box holder assembly are along the two sides of a stud that an electrical box can be placed on either side of said box holder assembly and held on said box holder assembly by said box holding spring with the horizontal depth of the electrical boxes with respect to the stud determined by said depth tabs on said box holder assembly first and second side surfaces and with the centerline alignment of one electrical box determined by the selection on said first binary gauge and with the centerline alignment of the other electrical box determined by the selection on said second binary gauge.

2. The alignment tool of claim 1, wherein said first and second binary gauges both further comprise:
   a gauge housing mounted on said rectangular tube and having a vertically aligned slot whose length is 11/32 inches; and
   a gauge having a mounting means that is slidably mounted in the vertically aligned slot in said first gauge housing and having a horizontal shelf for vertically aligning an electrical box; and
   wherein the position of said mounting means in the slot of said first gauge housing is selected as maximally up for 4 inch electrical boxes and maximally down for 4 1/16 inch electrical boxes.

3. The alignment tool of claim 2, wherein said frame further comprises:
   a top cylindrical socket integral to said frame; and
   a bottom cylindrical socket integral to said frame; and
   wherein said top cylindrical socket can accept and retain variable length height gauges for setting the distance of said frame from a ceiling; and
   wherein said bottom cylindrical socket can accept and retain variable length height gauges for setting the vertical distance of said frame from a floor.

4. An alignment tool for simultaneously and accurately installing a commercial electrical box on each side of a stud, comprising:
   a frame having at least one frame stud standoff; and
   a tube mounted to said frame so that said tube is held parallel to and away from the front of a stud by an amount set by said frame stud standoff; and
   a box holder assembly mounted on said tube and having first and second side surfaces extending away from and parallel to said frame and parallel to one another with said first and second side surfaces separated to by about 2 1/16 inches to accommodate the width of a stud and bracket offsets for two electrical boxes; and
   depth tabs on both the first and second side surfaces of said box holder assembly placed with respect to said frame stud standoff to provide for an electrical box setback of about ⅛ inch from the front of the stud to account for a plaster ring flange depth; and
   a means for holding an electrical box onto the first and second side surfaces of said box holder assembly and against said depth tabs; and
   a first binary gauge mounted on said tube below the first side of said box holder assembly wherein said first binary gauge has two positions for selecting the centerline alignment for an electrical box mounted on one side of a stud; and a second binary gauge mounted on said tube below the second side of said box holder assembly wherein said second binary gauge has two positions for selecting the centerline alignment for an electrical box mounted on the other side of a stud; and a height gauge mounted on said frame for setting the vertical distance between a plane such as a floor or ceiling and the centerline alignment of said electrical boxes determined by said first and second binary gauges; and wherein when said frame stud standoff is aligned along the front length of a stud and said box holder assembly first and second side surfaces are along the two sides of a stud that an electrical box can be placed on either side of said box holder assembly and held on said box holder assembly by said means for holding an electrical box onto the first and second side surfaces with the horizontal depth of the electrical boxes with respect to the stud determined by said depth tabs on said box holder assembly and with the centerline alignment of one electrical box determined by the selection on said first binary gauge and with the centerline alignment of another electrical box determined by the selection on said second binary gauge.

5. The alignment tool of claim 4, wherein said first and second binary gauges both further comprise:
 a gauge housing mounted on said tube and having a vertically aligned slot whose length is 11/32 inches; and
 a gauge having a mounting means that is slidably mounted in the vertically aligned slot in said first gauge housing and having a horizontal shelf for vertically aligning an electrical box; and
 wherein the position of said mounting means in the slot of said first gauge housing is selected as maximally up for 4 inch electrical boxes and maximally down for 4 11/16 inch electrical boxes.

6. The alignment tool of claim 5, wherein said frame further comprises:
 a top cylindrical socket integral to said frame; and
 a bottom cylindrical socket integral to said frame; and
 wherein said top cylindrical socket can accept and retain variable length height gauges for setting the distance of said frame from a ceiling; and
 wherein said bottom cylindrical socket can accept and retain variable length height gauges for setting the vertical distance of said frame from a floor.

7. The alignment tool of claim 6, wherein said a means for holding an electrical box onto the first and second side surfaces of said box holder assembly and against said depth tabs further comprises:
 a box holding spring mounted on said box holder assembly.

8. An alignment tool for simultaneously and accurately installing a commercial electrical box on each side of a stud, comprising:
 a frame; and
 a tube mounted to said frame; and
 means mounted to said tube for providing standoffs from a stud so that said tube is held parallel to and away from the front of a stud; and
 a box holder assembly mounted on said tube and having parallel first and second side surfaces extending away from said tube with said first and second side surfaces separated by the width of a stud plus electrical box mounting clearances or about 2 1/16 inches; and at least one depth tab on both said first and second side surfaces of said box holder assembly placed with respect to said means mounted to said tube for providing standoffs from said stud to provide for an electrical box setback of about ⅛ inch from the front of the stud to account for a plaster ring flange depth; and a means for holding an electrical box onto the first and second side surfaces of said box holder assembly and against said depth tabs; and a first binary gauge mounted on said tube below the first side of said box holder assembly wherein said first binary gauge has two positions for selecting the centerline alignment for an electrical box mounted on one side of a stud; and a second binary gauge mounted on said tube below the second side of said box-holder assembly wherein said second binary gauge has two positions for selecting the centerline alignment for an electrical box mounted on the other side of a stud; and a height gauge mounted on said frame for setting the vertical distance between a plane such as a floor or ceiling and the centerline alignment of said electrical boxes determined by said first and second binary gauges; and wherein when said means mounted to said tube for providing standoffs from a stud is aligned along the front length of a stud and said box holder assembly first and second side surfaces are along the two sides of a stud that an electrical box can be placed on either side of said box holder assembly and held on said box holder assembly by said means for holding an electrical box onto the first and second side surfaces with the horizontal depth of the electrical boxes with respect to the stud determined by said depth tabs on said box holder assembly and with the centerline alignment of one electrical box determined by the selection on said first binary gauge and with the centerline alignment of another electrical box determined by the selection on said second binary gauge.

9. The alignment tool of claim 8, wherein said first and second binary gauges both further comprise:
 a gauge housing mounted on said tube and having a vertically aligned slot whose length is 11/32 inches; and
 a gauge having a mounting means that is slidably mounted in the vertically aligned slot in said first gauge housing and having a horizontal shelf for vertically aligning an electrical box; and
 wherein the position of said mounting means in the slot of said first gauge housing is selected as maximally up for 4 inch electrical boxes and maximally down for 4 11/16 inch electrical boxes.

10. The alignment tool of claim 9, wherein said frame further comprises:
 a top cylindrical socket integral to said frame; and
 a bottom cylindrical socket integral to said frame; and
 wherein said top cylindrical socket can accept and retain variable length height gauges for setting the distance of said frame from a ceiling; and
 wherein said bottom cylindrical socket can accept and retain variable length height gauges for setting the vertical distance of said frame from a floor.

11. The alignment tool of claim 10, wherein said a means for holding an electrical box onto the first and second side surfaces of said box holder assembly and against said depth tabs further comprises:
 a box holding spring mounted on said box holder assembly.

* * * * *